United States Patent [19]

Iyama

[11] Patent Number: 5,808,811
[45] Date of Patent: Sep. 15, 1998

[54] ZOOM LENS SYSTEM

[75] Inventor: Noriyuki Iyama, Hachioji, Japan

[73] Assignee: Olympus Optical Co., Ltd., Tokyo, Japan

[21] Appl. No.: 713,035

[22] Filed: Sep. 12, 1996

[30]     Foreign Application Priority Data

Nov. 8, 1995  [JP]  Japan  ..................................  7-289925
Nov. 8, 1995  [JP]  Japan  ..................................  7-289926

[51] Int. Cl.⁶ .................................................. G02B 15/14
[52] U.S. Cl. ........................................... 359/692; 359/691
[58] Field of Search ..................... 359/654, 692, 359/691, 689, 695

[56]             References Cited

U.S. PATENT DOCUMENTS

| | | | |
|---|---|---|---|
| 4,830,476 | 5/1989 | Aoki ........................................ | 359/654 |
| 4,883,346 | 11/1989 | Aoki et al. ............................... | 359/692 |
| 4,953,957 | 9/1990 | Kobayashi .............................. | 359/692 |
| 4,963,010 | 10/1990 | Kikuchi .................................. | 359/654 |
| 4,963,016 | 10/1990 | Heijnemans et al. .................... | 359/692 |
| 5,011,272 | 4/1991 | Nakayama et al. ..................... | 359/654 |
| 5,046,833 | 9/1991 | Tsuchida ................................ | 359/654 |
| 5,196,962 | 3/1993 | Aoki ........................................ | 359/689 |
| 5,327,290 | 7/1994 | Fukushima et al. .................... | 359/692 |
| 5,566,026 | 10/1996 | Yoon ....................................... | 359/689 |
| 5,592,334 | 1/1997 | Oshikiri et al. ......................... | 359/689 |

FOREIGN PATENT DOCUMENTS 6-67092   3/1994   Japan .

Primary Examiner—Frank G. Font
Assistant Examiner—Michael P. Stafira
Attorney, Agent, or Firm—Cushman Darby & Cushman IP Group of Pillsbury Madison & Sutro LLP

[57]                ABSTRACT

The invention relates to a zoom lens system which, albeit having a zoom ratio as high as about 3.4, is quite well corrected for aberrations from the wide-angle to telephoto end thereof, and comprises a very reduced number of lenses involved. The zoom lens system comprises a plurality of lens groups (G1 and G2) with spaces therebetween, wherein at least one of said spaces is varied for zooming. The lens group G2 having negative refracting power is located nearest to the image surface side of the system, and includes at least one lens having positive refracting power, which is made of a gradient index lens having a refractive index varying in a direction perpendicular to the optical axis of the system. This gradient index lens has an aspheric surface on at least one side, and at least one lens having negative refracting power is located on the image surface side with respect to that gradient index lens.

14 Claims, 2 Drawing Sheets

ZOOM LENS SYSTEM

BACKGROUND OF THE INVENTION

1. Field of the Invention

The present invention relates generally to a zoom lens system, and more specifically to a compact zoom lens system for use on lens shutter cameras, which is made up of a reduced number of lenses and has a high zoom ratio.

2. Description of the Related Art

In general, zoom lens systems are required not only to be well corrected for aberrations at standard settings but also to remain reduced in terms of aberration variations during zooming. To this end it is desired that aberrations inclusive of spherical aberration, coma and chromatic aberration be well corrected at each lens unit or group. However, this inevitably results in an increase in the number of lenses in each lens group and, hence, a size increase.

Attempts are currently being made to reduce the size and weight of zoom lens systems in association with compact cameras. In particular, even lens shutter cameras composed of unexchangeable lenses are required to be compact and have a zoom ratio of at least 3. Some considerable cost reductions are greatly demanded as well.

Two-group zoom lens systems are known in the art which include a front group of positive refracting power and a rear group of negative refracting power with a space between them being varied for zooming, as disclosed typically in JP-A-61-159612. To allow such a lens arrangement to be compact and have a high zoom ratio, only the radius of curvature of each lens need be reduced to increase the refracting power thereof. In this case, however, it is impossible to reduce aberration variations during zooming, thereby achieving sufficient aberration correction and sufficient zoom ratios, without increasing the number of lenses involved or making the overall lens arrangement large. As the number of lenses increases, it is increasingly difficult to achieve cost reductions. When it is intended to weaken the refracting power of each lens thereby reducing aberration variations during zooming, on the other hand, there is an increase in the amount of movement of each group, which may otherwise make it impossible to achieve compactness.

To provide a solution to the aforesaid problems, it has so far been proposed in the art to reduce the number of lenses to four by the use of aspheric surfaces. A typical lens system including a first group consisting of negative and positive lenses, and a second group consisting of positive and negative lenses is disclosed in JP-A-3-127008, JP-A-3-274516, and JP-A-6-67092. This lens system has a zoom ratio of about 2.6 at most, and so is less than satisfactory in terms of high specification. It has also been put forward to incorporate a gradient index lens in two- or three-group zoom lens systems, as set forth typically in JP-A-61-148414, JP-A-61-259216, and JP-A-61-126515. These have a zoom ratio of the order of 1.5 to 2, and so are again unsatisfactory in terms of high specification.

Here let us consider a two-group zoom lens system as an example. When an attempt is made to raise its zoom ratio while the number of lenses involved remains reduced, it is required to intensify the refracting power of each group or increase the amount of movement of the final group. As the refracting power of each group intensifies, aberrations produced at each group increase with an increase in the aberrations of the overall optical system. Especially because the negative refracting power of the final group becomes strong, positive spherical aberration occurs at the telephoto end. Positive distortion becomes large, too, at the wide-angle end in particular. Moreover, coma becomes worse. As the amount of movement of the final group increases, coma again becomes worse at the telephoto end.

Zoom lens systems constructed from three or four groups for the purpose of achieving high zoom ratios have been proposed as disclosed typically in JP-A-63-43115, and JP-A-1-252916. Although the zoom ratio is increased to about 3, yet they are unsatisfactory in terms of compactness because at least eleven lenses are needed in spite of use of aspheric surfaces.

Examples of a zoom lens system having a zoom ratio of about 3, which makes use of a gradient index lens, are set forth in JP-A-63-159818, and JP-A-63-161423. These are again made up of eleven lenses at a minimum, and so are not quite satisfactory in terms of compactness.

A three-group zoom lens system, too, has similar problems as mentioned just above, because when it is attempted to achieve higher zoom ratios, the refracting power of the lens group located nearest to the image surface side and having negative refracting power becomes strong.

SUMMARY OF THE INVENTION

In view of the aforesaid problems associated with the prior art, an object of the present invention is to provide a zoom lens system which, albeit having a zoom ratio as high as about 3.4, is quite well corrected for aberrations from the wide-angle to telephoto end thereof, and is constructed from a very small number of lenses as well.

Another object of the present invention is to provide a zoom lens system which is made up of a very reduced number say, of four lenses, is inexpensive, and quite well corrected for aberrations from the wide-angle to telephoto end thereof.

According to a first aspect of the present invention, there is provided a zoom lens system characterized in that said zoom lens system comprises a plurality of lens groups with air spaces therebetween, a focal length of the overall system is varied by altering at least one of said air spaces, and a lens group of said plurality of lens groups, located nearest to an image side thereof, has negative power, said lens group of negative power comprising a lens having positive power, and a lens having negative power, which is located on the image side with respect to said lens having positive power, and said lens having positive power being a radial type of gradient index lens, at least one surface of which is an aspheric surface.

In the aforesaid zoom lens system comprising a plurality of lens groups with air spaces therebetween wherein a focal length of the overall system is varied by altering at least one of said air spaces, and a lens group of said plurality of lens groups, located nearest to the image side, has negative power, said lens group having negative power may include a gradient index lens having an aspheric surface.

In the aforesaid zoom lens system comprising a plurality of lens groups with air spaces therebetween wherein a focal length of the overall system is varied by altering at least one of said air spaces, any one of said plurality of lens groups may include a gradient index lens having an aspheric surface.

In these cases, it is particularly preferable that the gradient index lens is of a radial type.

According to a second aspect of the present invention, there is provided a zoom lens system characterized by comprising, in order from an object side thereof, a front group having positive power and a rear group having negative power, wherein:

a focal length of the overall system is varied by altering a space between said front and rear groups, said front group includes, in order from the object side, a lens having negative power and a lens having positive power, said rear group includes, in order from the object side, a lens having positive power and a lens having negative power, said front group has at least one aspheric surface, and said lens having positive power in said rear group is a radial type of gradient index lens.

A detailed account will now be given of why the aforesaid arrangements or layouts are used in the present invention, and how they work.

A gradient index lens is generally broken down into two types, one a so-called axial type of gradient index lens having a refractive index varying in the optical axis direction, and the other a so-called radial type of gradient index lens having a refractive index varying in a direction perpendicular to the optical axis. The present invention makes use of the radial type of gradient index lens having high optical potential.

A refractive index profile, at a reference wavelength, of the radial type of gradient index lens used herein is given by $$n(y)=N_0+N_1y^2+N_2Y^4+ \quad (1)$$

where N is a refractive index, at a reference wavelength, of a center of the lens, y is a radial distance from the center of the lens, n(y) is a refractive index, at a reference wavelength, of the lens as measured at the radius y from the center of the lens, and $N_1$, $N_2$, . . . are constants.

Here assume that a Z axis lies in a direction of propagation of light on the optical axis and a Y axis lies in a direction perpendicular to the optical axis. Then, the shape of the aspheric surface used herein is given by $$Z=(Y^2/r)/\{1+[1-(K+1)(Y/r)^2]^{1/2}\}+A_4Y^4+A_6Y^6+A_8Y^8+A_{10}Y^{10} \quad (2)$$

where r is a paraxial radius of curvature, and K, $A_4$, $A_6$, $A_8$, and $A_{10}$ are aspherical coefficients.

According to yet another aspect of the present invention, there is provided a zoom lens system characterized in that the aforesaid gradient index lens having positive refracting power has an aspheric surface on at least one side, and preferably aspheric surfaces on both sides.

This will now be explained.

A gradient index lens includes a medium which also has refracting power. If the refracting power of the surfaces has the same sign as the medium, that lens can, as a whole, have the same refracting power as a homogeneous lens, even when the surface shape is made gentler that of the homogeneous lens.

The refracting power of the medium of the gradient index lens is primarily dependent on the secondary coefficient $N_1$ in the aforesaid refractive index profile formula (1), and the thickness of the lens on the optical axis. If the sign of the coefficient $N_1$ is positive, the medium acts as a negative refracting power, and if the sign of $N_1$ is negative, the medium acts as a positive refracting power. Thus, the refracting power can be manipulated with both the surfaces and the medium so that the degree of freedom in aberration correction can be increased, correspondingly, with a decrease in the number of lenses involved.

Moreover, the gradient index lens, because its medium has refracting power, can be corrected for the Petzval sum.

The Petzval sum PS of the gradient index lens itself is given by $$PS=(\phi_S/N_0)+(\phi_M/N_0^2) \quad (3)$$

where $\phi_S$ is a refracting power of the surfaces of the gradient index lens and $\phi_M$ is a refracting power of the medium of the gradient index lens.

As can be clearly noted from the aforesaid formula, the Petzval sum of the gradient index lens can be varied with some degree of freedom by manipulating the refracting power of its surfaces and the refracting power of its medium. Accordingly, it is found that if such a gradient index lens is applied to the lens system of the present invention, it is then possible to make sufficient correction for the Petzval sum of the overall system even with a reduced number of lenses. It is further possible to introduce some considerable improvement in the performance of the overall system by using the refractive index profiles that the medium and surfaces have, because it is possible to make aberration correction with a correction term for those surfaces which behave differently than a homogeneous lens.

As mentioned above, the gradient index lens has a part of its refracting power shared by the medium, and so is suited for use in a lens group having particularly strong refracting power. When an attempt is made to impart high zoom ratios to such a lens system as contemplated in the present invention, the negative refracting power of a negative lens group located nearest to the image surface side becomes too strong to produce positive spherical aberration at the telephoto end in particular. For these reasons, it is advantageous that the gradient index lens is used for a lens within a lens group located nearest to the image surface side and having negative refracting power.

It is then desired that the coefficient N1 of the gradient index lens satisfy the following condition:

$$N_1>0 \quad (4)$$

This is because if the coefficient $N_1$ of the gradient index lens is greater than 0 or $N_1>0$ so that the medium can have negative refracting power, the negative refracting power of the negative lens group is dispersed throughout the medium to reduce aberrations produced at the negative lens group in its entirety.

Generally, in reference to a zoom lens system, it is required to construct each lens group from two lenses at a minimum, thereby reducing aberrations produced thereat. In the present invention, too, the negative lens group located nearest to the image surface side is constructed from at least one positive lens and at least one negative lens.

To achieve a further reduction in the number of lenses involved and to better correct for aberrations, it is advantageous that the negative lens group located nearest to the image surface side includes at least one negative lens located on the image surface side with the positive lens. Such a lens arrangement allows the negative lens group to behave as a so-called telephoto type wherein a rear principal point of the overall system can be moved toward the object side, and so is favorable in view of compactness.

Here let us consider one case where the gradient index lens is used for the negative lens in the negative lens group, and another case where the gradient index lens is used for the positive lens in the negative lens group.

Whether the gradient index lens is used for the negative lens or the positive lens, it is possible to make the coefficient $N_1$ of the gradient index lens greater than 0 ($N_1>0$) so that the medium can have negative refracting power, thereby dispersing the entire negative refracting power of the negative group throughout the medium. However, when a gradient index lens with $N_1>0$ is used for the negative lens, positive spherical aberration occurs at the medium while spherical aberration produced at a surface correction term becomes positive spherical aberration. Thus, it is not preferable to use the gradient index lens for the negative lens, because the occurrence of positive spherical aberration at the telephoto end in particular becomes prominent.

On the contrary, when a gradient index lens with $N_1>0$ is used for the positive lens, positive spherical aberration occurs in the medium. However, negative spherical aberration is produced at the surface correction term; that is, positive spherical aberration which increases as the negative refracting power of the negative lens group increases can be counteracted by use of the gradient index lens. Accordingly, the positive spherical aberration at the telephoto end in particular can be corrected.

As described above, the present invention is characterized by use of a gradient index lens for at least one lens having positive refracting power, which is included in the lens group located nearest to the image surface side and has negative refracting power.

By using a gradient index lens for the positive lens in the negative lens group, it is thus possible to make correction for spherical aberration at the telephoto end in particular. To achieve high zoom ratios while making correction for various aberrations, however, it is required to make a large difference And between a refractive index n(0) of the gradient index lens at its lens center and a refractive index n(yMAX) at a reference wavelength of the gradient index lens as measured at a location of its maximum effective radius yMAX, but this renders the manufacturing of gradient index lenses themselves difficult.

To eliminate this difficulty, at least one surface of the gradient index lens is made aspheric to produce negative spherical aberration, thereby correcting for spherical aberration that is liable to increase in a positive direction, and making effective correction for positive distortion that occurs especially at the wide-angle end as the refracting power of the negative lens group becomes strong.

As described above, the negative lens group is composed of at least one positive lens and at least one negative lens which is to be located on the image surface side with respect to that positive lens. In this layout, the height of marginal rays through the positive lens becomes relatively high while the height of off-axis rays becomes relatively low. To the contrary, the height of marginal rays through the negative lens becomes relatively low while the height of off-axis rays becomes relatively high. In other words, an aspheric surface, if used for the positive lens, has a particularly effective action on spherical aberration, and if used for the negative lens, has a particularly effective action on off-axis aberrations inclusive of distortion, and astigmatism.

When, as contemplated in the present invention, it is intended to make the zoom ratio of a zoom lens system high by extending its focal length at a telephoto end thereof, a problem arises in connection with positive spherical aberration produced at the telephoto end. It is thus preferable to apply the aspheric surface to the positive lens in the negative lens group. If the aspheric surface is shaped such that its positive refracting power increases farther off the optical axis, it is then possible to make sufficient correction for not only positive spherical aberration at the telephoto end but also positive distortion at the wide-angle end.

In view of lens processing, too, it is preferable to use an aspheric surface for the positive lens in the negative lens group, because that positive lens is smaller in effective diameter than at least one negative lens located on the image surface side with respect thereto.

In the present invention, the refractive index profile type of positive lens may preferably have aspheric surfaces on both sides. As described so far, the spherical aberration especially at the telephoto end can be well corrected by the application of an aspheric surface to at least one surface of the refractive index profile type of positive lens. However, if aspheric surfaces are used on both sides, it is then possible to make more effective correction for various aberrations. Moreover, if both aspheric surfaces are shaped such that their positive refracting power increases farther off the optical axis, it is then possible to make satisfactory correction for positive spherical aberration at the telephoto end.

It is here to be understood that the present invention is never limited to a two- or three-group zoom lens system, and so may be effective for an optical system comprising four or more groups, provided that a lens group located nearest to the image surface side is of negative refracting power.

The zoom lens system according to the second aspect of the present invention will now be explained.

For a zoom lens system it is required to reduce various aberrations, especially chromatic aberration produced at each lens group, and so it is required to construct each lens group from two lenses at a minimum. For this reason, the zoom lens system according the second aspect of the present invention comprises a front group consisting of, in order from an object side thereof, one negative lens and one positive lens, and a rear group consisting of, in order from the object side, one positive lens and one negative lens. An account will now be given of why each lens group is constructed as mentioned above.

For a two (positive/negative)-group zoom lens system like the zoom lens system according to the second aspect of the present invention, it is required for it to be short in terms of the total length of a wide-angle end thereof because it is designed for use on shutter cameras put on the market. How efficiently a rear principal point of the overall system is positioned toward an object side thereof is thus of importance. To this end, it is preferable to move a rear principal point of a rear group itself toward the object side, and construct the rear group from a positive lens and a negative lens in order from the object side. On the other hand, a particular problem associated with such a two (positive/negative)-group zoom lens system is that positive distortion occurs at a wide-angle end thereof. To make the total length of the optical system short at the wide-angle end, it is required to increase the negative refracting power of a rear group. However, the stronger that negative refracting power, the more prominent the occurrence of distortion is. A leading cause for distortion is asymmetry with respect to a stop. To make a front group symmetric with respect to such a rear group as mentioned before with a stop located between them, thereby preventing distortion from occurring at the wide-angle end, it is desired that the positive front group be made up of, in order from the object side, a negative lens and a positive lens.

When each group is constructed from two lenses, each lens being made of homogeneous glass with all surfaces formed of spherical surfaces, however, much difficulty is involved in making sufficient correction for various aberrations.

A two (positive/negative)-group zoom lens system such as one according to the second aspect of the present invention is designed such that, for zooming, an image formed by a front group is magnified through a rear group while the magnification is varied. For this reason, the longer the focal length of the system at a wide-angle end thereof, the more magnified the aberrations produced at the front group are; that is, the problem to be solved here is how various aberrations produced at the front group itself are reduced.

However, the aberrations themselves may be reduced by increasing the number of lenses involved, but this incurs some added cost. In the present invention, therefore, an aspheric surface is incorporated in at least one surface of the front group so that various aberrations can be reduced with no increase in the number of lenses used. Among the components forming the optical system, the front group produces negative spherical aberration most prominently, because the height of marginal rays through it becomes high. To allow the front group to produce negative distortion to thereby correct for distortion at the wide-angle end, it is desired that the aspheric surface used for the front group be shaped such that its positive refracting power decreases farther off the optical axis. This enables the occurrence of spherical aberration at the front group itself to be reduced to such an extent that such spherical aberration, even though magnified, has little, if any, influence, and distortions produced at the front and rear groups to be mutually counteracted. Especially by using a spherical surface for the negative lens of the front group located nearest to the object side, it is possible to make a great contribution to positive distortion at the wide-angle end, because the height of off-axis rays becomes high. Furthermore, if aspheric surfaces are used for both sides of that negative lens, it is possible to increase the degree of freedom, and make spherical aberration, distortion, coma, etc., sufficiently small.

When the refracting power of the rear group having negative refracting power is intensified especially for the purpose of making the total length of the optical system short, positive spherical aberration at the telephoto end, positive distortion at the wide-angle end, the Petzval sum, etc. become worse. In this regard, correction need be made. Among these, the spherical aberration and distortion may be corrected by the incorporation of an aspheric lens in the rear group. However, the Petzval sum can never be corrected by use of an aspheric lens. In the zoom lens system according to the second aspect of the present invention, therefore, a gradient index lens is incorporated in a lens of the rear group.

As described above, the gradient index lens has a part of its refracting power shared by the medium, and so is suited for use in a lens group having particularly strong refracting power.

For the aforesaid reason, in the zoom lens system according to the second aspect of the present invention, too, the gradient index lens is used for the rear group having negative refracting power which is liable to become strong.

It is then desired that the coefficient $N_1$ of the gradient index lens satisfy the aforesaid condition (4). This is because if the coefficient $N_1$ of the gradient index lens is greater than 0 (or $N_1>0$) so that the medium can have negative refracting power, the negative refracting power of the rear group is dispersed throughout the medium to reduce aberrations produced at the negative lens group in its entirety.

Here let us consider one case where the gradient index lens is used for the negative lens in the rear group, and another case where the gradient index lens is used for the positive lens in the rear group.

Whether the gradient index lens is used for the negative lens or the positive lens, it is possible to make the coefficient $N_1$ of the gradient index lens greater than 0 ($N_1>0$) so that the medium can have negative refracting power, thereby dispersing the entire negative refracting power of the rear group throughout the medium. However, when a gradient index lens with $N_1>0$ is used for the negative lens, positive spherical aberration occurs in the medium while spherical aberration produced at a surface correction term becomes positive spherical aberration. Thus, it is not preferable to use the gradient index lens for the negative lens, because the occurrence of positive spherical aberration at the telephoto end in particular becomes prominent.

On the contrary, when a gradient index lens with $N_1>0$ is used for the positive lens, positive spherical aberration occurs in the medium. However, negative spherical aberration is produced at the surface correction term; that is, positive spherical aberration which increases as the negative refracting power of the rear group increases can be counteracted by use of the gradient index lens. Accordingly, the positive spherical aberration at the telephoto end in particular can be corrected.

When the gradient index lens with $N_1>0$ is used for the positive lens in this way, the medium thereof acts as a negative lens so that the negative refracting power of the rear group can be shared by the positive lens. Consequently, it is possible to make the curvature of the negative lens of the rear group gentle, and so reduce positive distortion produced at the rear group.

As described above, it is further possible to manipulate the refracting powers of the surfaces and medium of the gradient index lens, thereby manipulating the Petzval sum thereof, so that the Petzval sum can be prevented from becoming worse.

According to the second aspect of the present invention as described above, there is provided a zoom lens system comprising, in order from an object side thereof, a front group having positive refracting power and a rear group having negative refracting power, with a space between them being varied for zooming, wherein the front group comprises, in order from the object side, a negative lens and a positive lens, and the rear group comprises, in order from the object side, a positive lens and a negative lens, said front group having an aspheric surface on at least one side, and the positive lens of said rear group being constructed from a gradient index lens. It is thus possible to provide a zoom lens system which is not only compact and inexpensive, but is also quite well corrected for various aberrations from the wide-angle to telephoto end.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 5 of the zoom lens system according to the present invention will now be explained with reference to the accompanying drawings.

To attain the objects of the present invention, each of the following Examples 1 to 3 provides a zoom lens system which comprises a plurality of lens groups (G1 and G2) with air spaces therebetween, as shown typically in FIG. 1, and wherein at least one of said air separations is varied for zooming, characterized in that said lens group G2 having negative refracting power is located nearest to an image surface side thereof, at least one lens of positive refracting power in said lens group G2 having negative refracting power is constructed from a gradient index lens having a refractive index varying in a direction perpendicular to an optical axis thereof, said gradient index lens having at least one aspheric surface, and at least one lens having negative refracting power is located on the image surface side with respect to said gradient index lens.

These zoom lens systems are further characterized in that the gradient index lens having positive refracting power has aspheric surfaces on both sides.

Figure 1A:
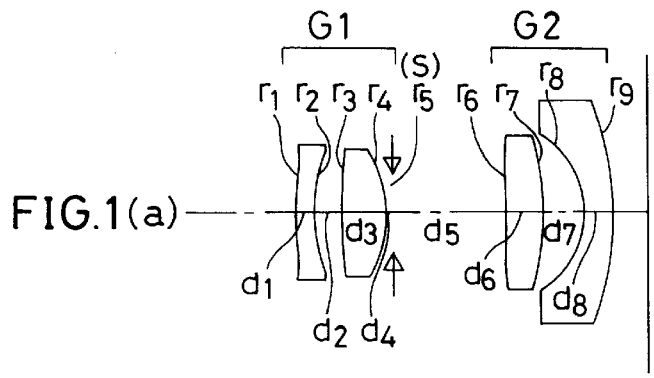
FIGS. 1(*a*), 1(*b*), and 1(*c*) show, in sections, Example 1 of the zoom lens system according to the present invention, and FIGS. 2(*a*), 2(*b*) and 2(*c*) show, in sections, Example 3 of the zoom lens system according to the present invention.
Figure 1B:
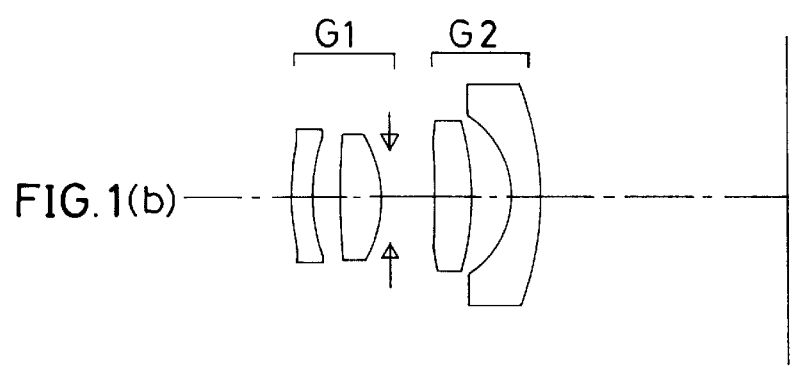
Figure 1C:
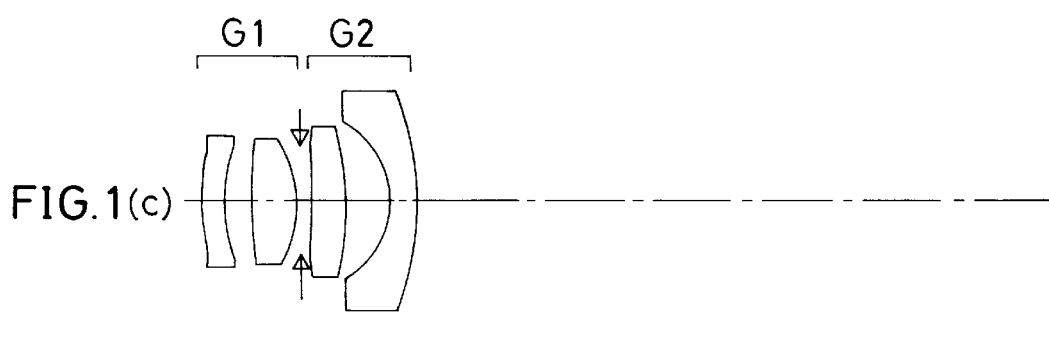

To attain the objects of the present invention, each of Examples 4 and 5 provides a zoom lens system which comprises, in order from an object side thereof, a front group G1 having positive refracting power and a rear group G2 having negative refracting power, as shown typically in FIGS. 1(a)–1(c), and wherein a space between said front and rear groups G1 and G2 is varied for zooming, characterized in that said front group G1 comprises a negative lens and a positive lens, said rear group G2 comprises a positive lens and a negative lens, and said front group G1 has an aspheric surface on at least one side, said positive lens in said rear group G2 being constructed from a gradient index lens.

A gradient index lens is generally broken down into two types, one a so-called axial type of gradient index lens having a refractive index varying in the optical axis direction, and a so-called radial type of gradient index lens having a refractive index varying in a direction perpendicular to the optical axis.

The present invention makes use of the radial type of gradient index lens having high optical potential.

In what follows, each example will be explained. A zoom lens system according to Example 1 consists of, in order from an object side thereof, a first group G1 having positive refracting power and a second group G2 having negative refracting power with a space between them being varied for zooming, as can be seen from FIGS. 1(a)–1(c) showing sections thereof at a wide-angle end FIG. 1(a) thereof, an intermediate focal length FIG. 1(b) thereof, and a telephoto end FIG. 1(c) thereof. The first group G1 consists of a negative meniscus lens having a convex surface directed toward the object side, and a double-convex positive lens, and includes a stop S on an image surface side of the system as an integral piece. The second group G2 consists of a positive meniscus lens having a convex surface directed toward the image surface side and a similar negative meniscus lens. The negative meniscus lens of the first group G1 has aspheric surfaces on both sides.

In Example 1, the lens having positive refracting power (the positive meniscus lens), which is used in the second group G2 and located nearest to the object side, is made of a gradient index lens. This gradient index lens is of aspheric shape at both surfaces. The positive lens of the first group G1, too, is made of a gradient index lens.

Thus, a compact zoom lens system comprising a reduced number of lenses but having a high zoom ratio is achieved.

Example 2 is almost similar in sectional shape to Example 1, and so is not illustrated. A zoom lens system according to this example consists of, in order from an object side thereof, a first group G1 having positive refracting power and a second group G2 having negative refracting power, with a space between them being varied for zooming. The first group G1 consists of a negative meniscus lens having a convex surface directed toward the object side, and a double-convex positive lens, and includes a stop S on an image surface side of the system as an integral piece. The second group G2 consists of a positive meniscus lens having a convex surface directed toward an image surface side of the system and a similar negative meniscus lens. The negative meniscus lens of the first group G1 has aspheric surfaces on both sides.

In Example 2, the lens having positive refracting power (the positive meniscus lens), which is used in the second group G2 and located nearest to the object side, is made of a gradient index lens. This gradient index lens is of aspheric shape at an object-side surface thereof. The positive lens of the first group G1, too, is made of a gradient index lens.

Thus, a compact zoom lens system comprising a reduced number of lenses but having a high zoom ratio is achieved. Moreover, this zoom lens system is favorable in view of processing because the aspheric shape is given to only the object-side surface of the gradient index lens in the second group G2.

Figure 2A:
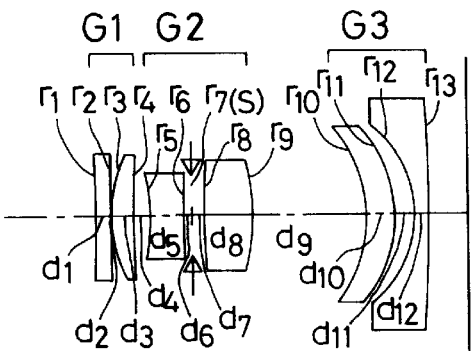
Figure 2B:
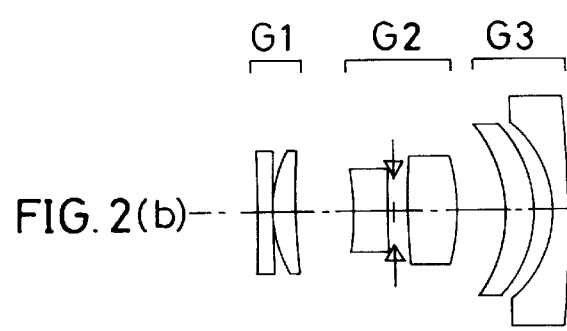
Figure 2C:
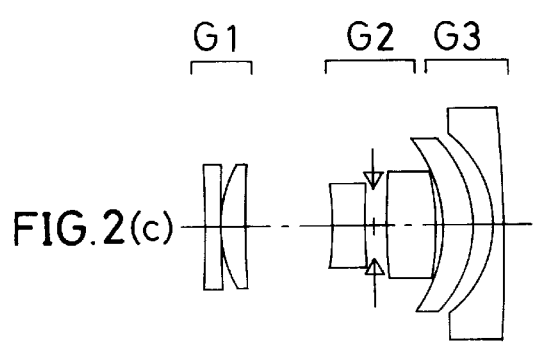

A zoom lens system according to Example 3 consists of, in order from an object side thereof, a first group G1 having positive refracting power, a second group G2 having positive refracting power and a third group G3 having negative refracting power with a space between the first and second groups G1 and G2 and a space between the second and third lens groups G2 and G3 being varied for zooming, as can be seen from FIGS. 2(a)–2(c) showing sections thereof at a wide-angle end FIG. 2(a) thereof, an intermediate focal length FIG. 2(b) thereof, and a telephoto end FIG. 2(c) thereof. The first group G1 consists of a double-concave negative lens and a positive meniscus lens having a convex surface directed toward the object side, and the second lens group G2 consists of a double-concave negative lens and a double-convex positive lens, with a stop S located between both the groups as an integral piece. The third group G3 consists of a positive meniscus lens having a convex surface directed toward an image surface side of the system and a similar negative meniscus lens.

In Example 3, the lens having positive refracting power (the positive meniscus lens), which is used in the third group G3 and located nearest to the object side, is made of a gradient index lens. This gradient index lens is of aspheric shape at an object-side surface thereof.

Thus, a compact zoom lens system comprising a reduced number of lenses but having a high zoom ratio is achieved.

Example 4 is almost similar in sectional shape to Example 1, and so is not illustrated. A zoom lens system according to this example consists of, in order from an object side thereof, a front group G1 having positive refracting power and a rear group G2 having negative refracting power, with a space between them being varied for zooming. The front group G1 consists of a negative meniscus lens having a convex surface directed toward the object side, and a double-convex positive lens, and includes a stop S on an image surface side thereof as an integral piece. The rear group G2 consists of a positive meniscus lens having a convex surface directed toward an image surface side of the system and a similar negative meniscus lens.

In Example 4, the negative meniscus lens, which is used in the front group G1 and located nearest to the object side, has aspheric surfaces on both sides, and the positive meniscus lens, which is used in the rear group G2 and located nearest to the object side, is made of a gradient index lens. Thus, a compact zoom lens system comprising a reduced number of lenses but having a high zoom ratio is achieved.

Example 5, too, is almost similar in sectional shape to Example 4, and so is not illustrated. A zoom lens system according to this example consists of, in order from an object side thereof, a front group G1 having positive refracting power and a rear group G2 having negative refracting power, with a space between them being varied for zooming. The front group G1 consists of a negative meniscus lens having a convex surface directed toward the object side, and a double-convex positive lens, and includes a stop S on an image surface side thereof as an integral piece. The rear group G2 consists of a positive meniscus lens having a convex surface directed toward an image surface side of the system and a similar negative meniscus lens.

In Example 5, the negative meniscus lens, which is used in the front group G1 and located nearest to the object side, has aspheric surfaces on both sides, and the positive meniscus lens, which is used in the rear group G2 and located nearest to the object side, is made of a gradient index lens. Moreover, this example is favorable in view of cost because the positive lens of the front group G1 is formed of material having a relatively low index of refraction. Thus, a compact zoom lens system comprising a reduced number of lenses but having a high zoom ratio is achieved.

Numerical data on the aforesaid respective examples will be given below. Symbols used hereinafter but not hereinbefore have the following meanings:

f is the focal length of the overall system, $F_{NO}$ is the F-number, $\omega$ is the half field angle, $f_B$ is the back focus of the system upon being focused on infinity, $r_1, r_2, \ldots$ are the radii of curvature of the respective lens surfaces, $d_1, d_2, \ldots$ are the spaces between the respective adjacent lens surfaces, $n_{d1}, n_{d2}, \ldots$ are the d-line indices of refraction of the respective lenses, and $\nu_{d1}, \nu_{d2}, \ldots$ are the Abbe's numbers of the respective lenses.

Here, let Z and Y stand for a direction of propagation of light on the optical axis and a direction perpendicular to the optical axis, respectively. Then, the aspheric shape is represented by $$Z=(Y^2/r)/\{1+[1-(K+1)(Y/r)^2]^{1/2}\}+A_4Y^4+A_6Y^6+A_8Y^8+A_{10}Y^{10} \quad (2)$$

where r is a paraxial radius of curvature, and K, $A_4$, $A_6$, $A_8$, and $A_{10}$ are aspherical coefficients.

The so-called radial type of gradient index lens, which is used in each example and has a refractive index profile in a direction perpendicular to the optical axis (and will be referred to as "GRIN" in the numerical data), has a refractive index profile represented by $$n(y)=N_0+N_1y^2+N_2Y^{4+} \quad (1)$$

where $N_0$ is a refractive index, at a reference wavelength, of a center of the lens, y is a radial distance from the center of the lens, n(y) is a refractive index, at a reference wavelength, of the lens as measured at the radius y from the center of the lens, and $N_1, N_2, \ldots$ are constants.

Symbols nod and nid with respect to the gradient index lens are constants represented by $$\nu od=(N_{od}-1)/(N_{OF}-N_{OC}) \quad (5)$$

$$\nu id=N_{id}/(N_{iF}-N_{iC}) \quad (6)$$

where $N_{od}$, $N_{OF}$ and $N_{OC}$ are d-, F-, and C-line indices of refraction of the lens on the optical axis, and $N_{id}$, $N_{iF}$ and $N_{iC}$ are 2i-th profile coefficients of d-, F-, and C-lines of the lens. Enumerated below are the numerical data on the aforesaid Examples 1–5.

Example 1 f = 39.01~72.30~133.78
$F_{NO}$ = 3.60~5.87~9.50
$\omega$ = 29.01~16.67~9.18°
$f_B$ = 4.46~33.91~88.31

| | | |
|---|---|---|
| $r_1$ = 25.8987 (Aspheric) | $d_1$ = 2.7744 | $n_{d1}$ = 1.84666 $\nu_{d1}$ = 23.78 |
| $r_2$ = 19.3356 (Aspheric) | $d_2$ = 3.7238 | |
| $r_3$ = 83.1780 | $d_3$ = 6.6456 | GRIN-1 |
| $r_4$ = −15.3783 | $d_4$ = 0.1000 | |
| $r_5$ = ∞ (Stop) | $d_5$ = (Variable) | |
| $r_6$ = −146.7940 (Aspheric) | $d_6$ = 5.3221 | GRIN-2 |
| $r_7$ −= 37.4853 (Aspheric) | $d_7$ = 5.5968 | |
| $r_8$ = 42.6851 | $d_8$ = 4.0993 | $n_{d4}$ = 1.77250 $\nu_{d4}$ = 49.60 |
| $r_9$ = −42.6851 | | |

Zooming Spaces

| f | 39.01 | 72.30 | 133.78 |
|---|---|---|---|
| $d_5$ | 16.0880 | 6.4670 | 1.2860 |

Aspherical Coefficients

1st surface

K = 0
$A_4$ = −1.1999 × 10⁻⁴
$A_6$ = −7.0203 × 10⁻⁷
$A_8$ = 2.2850 × 10⁻⁹
$A_{10}$ = 3.8162 × 10⁻¹⁵

2nd surface

K = 0
$A_4$ = −1.0246 × 10⁻⁴
$A_6$ = −5.2145 × 10⁻⁷
$A_8$ = 6.5715 × 10⁻⁹
$A_{10}$ = 3.7930 × 10⁻¹³

6th surface

K = 0
$A_4$ = 3.8168 × 10⁻⁵
$A_6$ = 4.7400 × 10⁻⁹
$A_8$ = 7.9294 × 10⁻¹⁰
$A_{10}$ = 1.0991 × 10⁻¹³

7th surface

K = 0
$A_4$ = 3.3331 × 10⁻⁶
$A_6$ = −2.6277 × 10⁻⁸
$A_8$ = −9.6421 × 10⁻¹⁰
$A_{10}$ = 1.0146 × 10⁻¹³

GRIN-1

$N_0$ = 1.563370
$N_1$ = 9.7518 × 10⁻⁵
$N_2$ = 1.0454 × 10⁻⁶
$\nu_{0d}$ = 60.00
$\nu_{1d}$ = 8.6905
$\nu_{2d}$ = 6.3160 × 10⁺¹

GRIN-2

$N_0$ = 1.574990
$N_1$ = 4.9692 × 10⁻⁴
$N_2$ = 1.5545 × 10⁻⁷
$\nu_{0d}$ = 37.00
$\nu_{1d}$ = 9.8014 × 10⁺¹
$\nu_{2d}$ = 3.0490 × 10⁺¹

Example 2

| | | |
|---|---|---|
| | $f = 39.01\sim72.30\sim133.78$ | |
| | $F_{NO} = 3.60\sim5.87\sim9.50$ | |
| | $\omega = 29.01\sim16.67\sim9.18°$ | |
| | $f_B = 4.45\sim33.89\sim88.25$ | |
| $r_1 = 25.8624$ (Aspheric) | $d_1 = 2.7745$ | $n_{d1} = 1.84666\ \nu_{d1} = 23.78$ |
| $r_2 = 19.3414$ (Aspheric) | $d_2 = 3.7238$ | |
| $r_3 = 83.5721$ | $d_3 = 6.6454$ | GRIN-1 |
| $r_4 = -15.3854$ | $d_4 = 0.1000$ | |
| $r_5 = \infty$ (Stop) | $d_5 =$ (Variable) | |
| $r_6 = -146.6621$ (Aspheric) | $d_6 = 5.3219$ | GRIN-2 |
| $r_7 = -37.4942$ | $d_7 = 5.5968$ | |
| $r_8 = -11.9237$ | $d_8 = 4.10\ 01$ | $n_{d4} = 1.77250\ \nu_{d4} = 49.60$ |
| $r_9 = -42.7350$ | | |

Zooming Spaces

| f | 39.01 | 72.30 | 133.78 |
|---|---|---|---|
| $d_5$ | 16.0835 | 4.4655 | 1.2864 |

Aspherical Coefficients

1st surface $K = 0$
$A_4 = -1.2029 \times 10^{-4}$
$A_6 = -8.8969 \times 10^{-7}$
$A_8 = 6.8070 \times 10^{-9}$
$A_{10} = 2.5204 \times 10^{-11}$ 2nd surface $K = 0$
$A_4 = -1.0338 \times 10^{-4}$
$A_6 = -8.4262 \times 10^{-7}$
$A_8 = 1.5758 \times 10^{-8}$
$A_{10} = -5.9487 \times 10^{-11}$ 6th surface $K = 0$
$A_4 = 3.6152 \times 10^{-5}$
$A_6 = -1.8326 \times 10^{-7}$
$A_8 = 7.0651 \times 10^{-9}$
$A_{10} = -3.6443 = 10^{-11}$

GRIN-1

$N_0 = 1.563370$
$N_1 = 9.7518 \times 10^{-5}$
$N_2 = 1.0454 \times 10^{-6}$
$\nu_{0d} = 60.00$
$\nu_{1d} = 8.6905$
$\nu_{2d} = 6.3160 \times 10^{+1}$

GRIN-2

$N_0 = 1.574990$
$N_1 = 4.9692 \times 10^{-4}$
$N_2 = 1.5545 \times 10^{-7}$
$\nu_{0d} = 37.00$
$\nu_{1d} = 9.8014 \times 10^{+1}$
$\nu_{2d} = 3.0490 \times 10^{+1}$

Example 3

| | | |
|---|---|---|
| | $f = 36.75\sim70.68\sim135.82$ | |
| | $F_{NO} = 3.60\sim5.90\sim9.85$ | |
| | $\omega = 30.48\sim17.02\sim9.05°$ | |
| | $f_B = 5.19\sim28.75\sim72.03$ | |
| $r_1 = -222.3525$ | $d_1 = 2.1440$ | $n_{d1} = 1.84666\ \nu_{d1} = 23.78$ |
| $r_2 = 153.7652$ | $d_2 = 0.1200$ | |
| $r_3 = 19.3933$ | $d_3 = 3.0773$ | $n_{d2} = 1.69680\ \nu_{d2} = 55.53$ |
| $r_4 = 110.4690$ | $d_4 =$ (Variable) | |
| $r_5 = -41.5543$ | $d_5 = 4.8827$ | GRIN-1 |
| $r_6 = 634.1938$ | $d_6 = 0.7116$ | |
| $r_7 = \infty$ (Stop) | $d_7 = 1.9919$ | |
| $r_8 = 112.4261$ | $d_8 = 6.9769$ | GRIN-2 |
| $r_9 = -20.4783$ | $d_9 =$ (Variable) | |
| $r_{10} = -18.4369$ (Aspheric) | $d_{10} = 4.6366$ | GRIN-3 |
| $r_{11} = -16.3872$ | $d_{11} = 2.1753$ | |
| $r_{12} = -14.7410$ | $d_{12} = 1.9874$ | $n_{d6} = 1.69680\ \nu_{d6} = 55.53$ |
| $r_{13} = -246.2346$ | | |

Zooming Spaces

| f | 36.75 | 70.68 | 135.82 |
|---|---|---|---|
| $d_4$ | 1.9000 | 7.7720 | 11.9730 |
| $d_9$ | 14.8750 | 6.0800 | 0.4490 |

Aspherical Coefficients

10th surface $K = 0$
$A_4 = 8.3268 \times 10^{-6}$
$A_6 = 1.5647 \times 10^{-7}$
$A_8 = -1.3259 \times 10^{-9}$
$A_{10} = 6.4565 \times 10^{-12}$

GRIN-1

$N_0 = 1.840700$
$N_1 = 1.9724 \times 10^{-4}$
$N_2 = 5.4363 \times 10^{-6}$
$\nu_{0d} = 43.42$
$\nu_{1d} = -3.6893$
$\nu_{2d} = 1.9788 \times 10^{+1}$

GRIN-2

$N_0 = 1.573310$
$N_1 = -7.6013 \times 10^{-4}$
$N_2 = -2.4574 \times 10^{-6}$
$\nu_{0d} = 61.83$
$\nu_{1d} = -3.6527 \times 10^{+1}$
$\nu_{2d} = -7.1944$

GRIN-3

$N_0 = 1.764930$
$N_1 = 6.5194 \times 10^{-4}$
$N_2 = 4.8191 \times 10^{-9}$
$\nu_{0d} = 21.19$
$\nu_{1d} = 2.7770 \times 10^{+1}$
$\nu_{2d} = 9.6653 \times 10^{+3}$

Example 4

| | | |
|---|---|---|
| | $f = 39.01\sim55.45\sim78.85$ | |
| | $F_{NO} = 3.60\sim5.12\sim7.28$ | |
| | $\omega = 29.01\sim21.31\sim15.34°$ | |
| | $f_B = 8.44\sim24.21\sim46.65$ | |
| $r_1 = 21.3900$ (Aspheric) | $d_1 = 2.9802$ | $n_{d1} = 1.84666\ \nu_{d1} = 23.78$ |
| $r_2 = 14.2788$ (Aspheric) | $d_2 = 4.6417$ | |
| $r_3 = 52.7621$ | $d_3 = 6.6332$ | $n_{d2} = 1.56384\ \nu_{d2} = 60.70$ |
| $r_4 = -14.7072$ | $d_4 = 0.6863$ | |
| $r_5 = \infty$ (Stop) | $d_5 =$ (Variable) | |
| $r_6 = -118.3925$ | $d_6 = 3.7925$ | GRIN |
| $r_7 = -21.8997$ | $d_7 = 4.5167$ | |
| $r_8 = -13.0668$ | $d_8 = 3.7968$ | $n_{d4} = 1.77250\ \nu_{d4} = 49.60$ |
| $r_9 = -165.9024$ | | |

Zooming Spaces

| f | 39.01 | 55.45 | 78.85 |
|---|---|---|---|
| $d_5$ | 14.19 | 8.04 | 3.71 |

Aspherical Coefficients

1st surface $K = 0$
$A_4 = -1.2541 \times 10^{-4}$
$A_6 = -7.3280 \times 10^{-7}$
$A_8 = 1.8110 \times 10^{-9}$
$A_{10} = -4.3470 \times 10^{-12}$ 2nd surface -continued

```
K = 0
A₄ = -1.1367 × 10⁻⁴
A₆ = -6.5770 × 10⁻⁷
A₈ = 6.5577 × 10⁻⁹
A₁₀ = 3.5930 × 10⁻¹²
```
GRIN $N_0 = 1.645870$
$N_1 = 1.1928 \times 10^{-3}$
$N_2 = 2.7958 \times 10^{-6}$
$\nu_{0d} = 37.00$
$\nu_{1d} = 2.4684 \times 10^{+1}$
$\nu_{2d} = 3.0490 \times 10^{+1}$ Example 5

$f = 39.01 \sim 55.45 \sim 78.84$
$F_{NO} = 3.60 \sim 5.12 \sim 7.28$
$\omega = 29.01 \sim 21.31 \sim 15.34°$
$f_B = 8.59 \sim 24.87 \sim 48.04$ $r_1 = 22.7453$ (Aspheric)  $d_1 = 2.9747$  $n_{d1} = 1.58423$  $\nu_{d1} = 30.49$
$r_2 = 12.9783$ (Aspheric)  $d_2 = 4.6232$
$r_3 = 41.1615$             $d_3 = 6.6179$  $n_{d2} = 1.56384$  $\nu_{d2} = 60.70$
$r_4 = -15.6523$            $d_4 = 0.6863$
$r_5 = \infty$ (Stop)       $d_5 =$ (Variable)
$r_6 = -75.1729$            $d_6 = 3.8706$   GRIN
$r_7 = -20.4050$            $d_7 = 4.6080$
$r_8 = -12.9523$            $d_8 = 3.7400$   $n_{d4} = 1.77250$  $\nu_{d4} = 49.60$
$r_9 = -113.3060$ Zooming Spaces

| f   | 39.01 | 55.45 | 78.84 |
|-----|-------|-------|-------|
| $d_5$ | 14.38 | 8.09 | 3.65 |

Aspherical Coefficients

1st surface

```
K = 0
A₄ = -1.9310 × 10⁻⁴
A₆ = -7.3835 × 10⁻⁷
A₈ = 9.3889 × 10⁻⁹
A₁₀ = -4.3332 × 10⁻¹¹
```

2nd surface

```
K = 0
A₄ = -1.8588 × 10⁻⁴
A₆ = -5.0525 × 10⁻⁷
A₈ = 1.8840 × 10⁻⁸
A₁₀ = -1.0250 × 10⁻¹⁰
```

GRIN $N_0 = 1.638616$
$N_1 = 1.0888 \times 10^{-3}$
$N_2 = 2.8107 \times 10^{-6}$
$\nu_{0d} = 36.00$
$\nu_{1d} = 1.5443 \times 10^{+1}$
$\nu_{2d} = -6.1500$ As can be understood from the foregoing explanation, the present invention successfully provides a zoom lens system which, albeit having a zoom ratio as high as 3.4 or more, is quite well corrected for various aberrations from its wide-angle to telephoto end, and comprises a very reduced number of lenses.

The present invention also provides a zoom lens system which is constructed from a very reduced number, say, of four, lenses, is inexpensive, and quite well corrected for various aberrations from its wide-angle to telephoto end.

The entireties of JP-7-289925 and JP-7-289926, filed on Nov. 8, 1995, from which priority under 35USC 119is claimed, are incorporated hereby by reference:

What I claim is:

1. A zoom lens system comprising a plurality of lens groups with air spaces therebetween wherein
    a focal length of the overall zoom lens system is varied by altering at least one of said air spaces,
    a lens group of said plurality of lens groups is located nearest to an image side thereof and has a negative power,
    said lens group of negative power comprises a lens having positive power and a lens having negative power located on the image side with respect to said lens having positive power, and
    said lens having positive power is a radial type of gradient index lens having at least one surface which is an aspheric surface.

2. A zoom lens system according to claim 1, wherein
    said gradient index lens having positive power has aspheric surfaces on both sides.

3. A zoom lens system according to claim 1 or 2, wherein when a refractive index of said gradient index lens is represented by the following formula (1), said gradient index lens satisfies the following condition (4):

$$n(y) = N_0 + N_1 y^2 + N_2 Y^4 + \ldots \quad (1)$$

$$N_1 > 0 \quad (4)$$

where $N_0$ is a refractive index at a reference wavelength of a center of the lens, y is a radial distance from the center of the lens, n(y) is a refractive index at a reference wavelength of the lens as measured at the radius y from the center of the lens, and $N_1$, $N_2$, are constants.

4. A zoom lens system according to claim 1 or 2, wherein
    said aspheric surface is shaped such that a positive refracting power thereof becomes strong farther off an optical axis of said system.

5. A zoom lens system according to claim 1 or 2, wherein
    said zoom lens system includes one lens group having positive power on an object side of said lens group located nearest to the image side of said zoom lens system.

6. A zoom lens system according to claim 5, wherein
    said lens group having positive power includes a negative meniscus lens having an aspheric surface, and a positive lens.

7. A zoom lens system according to claim 5, wherein
    said lens group having positive power includes a negative meniscus lens having an aspheric surface and a gradient index lens having positive power.

8. A zoom lens system according to claim 1, wherein
    said zoom lens system includes, on an object side of said lens group located nearest to the image side, a first lens group having positive power, and a second lens group having positive power.

9. A zoom lens system according to claim 8, wherein
    said second lens group includes a gradient index lens.

10. A zoom lens system m comprising a plurality of lens groups with air spaces therebetween, wherein
    a focal length of the overall zoom lens system is varied by altering at least one of said air spaces,
    a lens group of said plurality of lens groups, located nearest to an image side thereof, has negative power, and
    said lens group of negative power includes a gradient index lens having an aspheric surface.

11. A zoom lens system comprising a plurality of lens groups with air spaces therebetween, wherein a focal length of the overall zoom lens system is varied by altering at least one of said air spaces, and any one of said plurality of lens groups includes a gradient index lens having an aspheric surface.

12. A zoom lens system comprising, in order from an object side thereof:

a front group having positive power; and a rear group having negative power, wherein a focal length of the overall zoom lens system is varied by altering a space between said front and rear groups, said front group includes, in order from the object side, a lens having negative power and a lens having positive power, said rear group includes, in order from the object side, a lens having positive power, and a lens having negative power, said front group has at least one aspheric surface, and said lens having positive power in said rear group is a radial type of gradient index lens.

13. A zoom lens system according to claim 11, wherein when a refractive index of said gradient index lens is represented by the following formula (1), said gradient index lens satisfies the following condition (4):

$$n(y) = N_0 + N_1 Y^2 + N_2 Y^4 + \ldots \tag{1}$$

$$N_1 > 0 \tag{4}$$

where $N_0$ is a index at a reference wavelength of a center of the gradient index lens, y is a radial distance from the center of the gradient index lens, n(y) is a refractive index at a reference wavelength of the gradient index lens as measured at the radius y from the center of the lens, and $N_1$, $N_2$, are constants.

14. A zoom lens system according to claim 10 or 11, wherein said gradient index lens is a radial type of gradient index lens.

* * * * *